United States Patent
Xu

(10) Patent No.: US 12,120,672 B2
(45) Date of Patent: Oct. 15, 2024

(54) METHODS FOR CONTROLLING COMMUNICATION STATES, TERMINAL, AND NETWORK DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 326 days.

(21) Appl. No.: 17/539,077

(22) Filed: Nov. 30, 2021

(65) Prior Publication Data
US 2022/0086879 A1 Mar. 17, 2022

Related U.S. Application Data

(63) Continuation of application No. PCT/CN2020/090082, filed on May 13, 2020.

(51) Int. Cl.
H04W 72/1268 (2023.01)
H04W 72/23 (2023.01)
H04W 76/28 (2018.01)

(52) U.S. Cl.
CPC ....... *H04W 72/1268* (2013.01); *H04W 72/23* (2023.01); *H04W 76/28* (2018.02)

(58) Field of Classification Search
CPC ............. H04W 72/23; H04W 72/1268; H04W 76/28
USPC ....................................................... 370/329
See application file for complete search history.

(56) References Cited

U.S. PATENT DOCUMENTS

| 10,588,171 B2* | 3/2020 | Ang ................. H04W 52/0216 |
| 11,647,462 B2* | 5/2023 | Lin ................... H04W 52/0274 |
| | | 370/311 |
| 2017/0099635 A1 | 4/2017 | Uchino et al. |
| 2017/0332396 A1 | 11/2017 | Liao et al. |
| 2017/0367046 A1 | 12/2017 | Papasakellariou |
| 2018/0235024 A1 | 8/2018 | Fan et al. |
| 2018/0279223 A1 | 9/2018 | Kim et al. |

(Continued)

FOREIGN PATENT DOCUMENTS

| CN | 106817774 A | 6/2017 |
| CN | 108184267 A | 6/2018 |

(Continued)

OTHER PUBLICATIONS

Communication pursuant to Article 94(3) EPC for EP Application 20827351.6 mailed Aug. 29, 2023. (5 pages).

(Continued)

*Primary Examiner* — Peter G Solinsky
(74) *Attorney, Agent, or Firm* — Young Basile Hanlon & MacFarlane, P.C.

(57) ABSTRACT

Methods for controlling communication states, a terminal, and a network device are provided. The method includes the following. The terminal receives a physical downlink control channel (PDCCH) from a network device in a first time slot, where the PDCCH carries first indication information indicative of a first communication state. The terminal enters the first communication state in a second time slot according to the first indication information, where the second time slot is after the first time slot.

24 Claims, 5 Drawing Sheets

(56) References Cited

U.S. PATENT DOCUMENTS

| | | | | |
|---|---|---|---|---|
| 2018/0332655 | A1* | 11/2018 | Ang | H04W 52/0216 |
| 2019/0297576 | A1* | 9/2019 | Jose | H04W 52/0216 |
| 2020/0267643 | A1* | 8/2020 | Wu | H04L 5/0092 |
| 2020/0314811 | A1* | 10/2020 | Lin | H04L 5/0094 |
| 2020/0389874 | A1* | 12/2020 | Lin | H04L 5/0053 |
| 2022/0167266 | A1* | 5/2022 | Nimbalker | H04W 72/20 |

FOREIGN PATENT DOCUMENTS

| | | |
|---|---|---|
| CN | 109392141 A | 2/2019 |
| CN | 109495954 A | 3/2019 |
| CN | 109565403 A | 4/2019 |
| KR | 20180137342 A | 12/2018 |
| WO | 2017194023 A1 | 11/2017 |
| WO | 2018208956 A1 | 11/2018 |

OTHER PUBLICATIONS

Apple Inc., Cross Slot Scheduling for UE Power Saving, 3GPP TSG RAN WG1 #96bis, R1-1904986, Apr. 8-12, 2019. (9 pages).
Chinese First Office Action with English Translation for CN Application 202110352757.7, mailed Jul. 20, 2022. (17 pages).
Extended European Search Report for EP Application 20827351.6 mailed May 20, 2022. (6 pages).
Chinese Rejection decision Action with English Translation for CN Application 202110352757.7 mailed Feb. 23, 2023. (17 pages).
Communication pursuant to Article 94(3) EPC for EP Application 20827351.6 mailed Feb. 8, 2023. (5 pages).
Chinese Second Office Action with English Translation for CN Application 202110352757.7, mailed Oct. 25, 2022 (14 pages).
Indian First Examination Report for IN Application 202117053628 mailed Dec. 8, 2022. (2 pages).
3GPP TSG RAN WG1 meeting #89 Hangzhou, P.R. China R1-1707726, Guangdong OPPO Mobile Telecom, On symbol-level time-domain resource allocation, May 15-19, 2017, 7 pages.
3GPP TSG RAN WG1 #97 Reno, USA, R1-1906578, OPPO,Considerations on cross-slot scheduling for power saving, May 13-17, 2019, 7 pages.
3GPP TSG RAN WG1 Meeting #94bis Chengdu, China, ZTE, Consideration on UE adaptation to the traffic and UE power consumption characteristics, R1-1810338, Oct. 8-12, 2018, 6 pages.
International Search Report with English Translation for PCT Application PCT/CN2019/091952 mailed Mar. 20, 2020. (12 pages).
3GPP TSG RAN WG1 Meeting #90 Prague, Czech Republic, Guangdong OPPO Mobile Telecom, Time-domain resource allocation for NR, R1-1713263, Aug. 21-25, 2017, 8 pages.
3GPP TSG RAN WG1 #97 Reno, USA, Huawei, HISilicon, Procedure of cross-slot scheduling for UE power saving, R1-1906006, May 13-17, 2019, 12 pages.
International Search Report with English Translation for PCT Application PCT /CN2020/090082 mailed Aug. 12, 2020. (11 pages).
Apple Inc., "Cross Slot Scheduling for UE Power Saving", 3GPP TSG RAN WG1#97 R1-1907346, May 13-17, 2019. 10 pages.
ZTE, "Procedure of cross-slot scheduling power saving techniques", 3GPP TSG RAN WG1#97 R1-1906640, May 13-May 17, 2019. 4 pages.
Vivo, "Discussion on cross-slot scheduling power saving techniques", 3GPP TSG RAN WG1#97 R1-1906171, May 13-17, 2019. 5 pages.
Ericsson, "Adaptation aspects of NR UE power saving", 3GPP TSG-RAN WG1 Meeting AH-1901 R1-1901166, Jan. 21-25, 2019. 7 pages.
Notice of Reasons for Refusal issued in corresponding JP application No. JP2021-573197 dated Jan. 19, 2024. 10 pages with English translation.
Search report and written opinion issued in corresponding SG application No. 11202113551R dated Feb. 7, 2024. 9 pages.
Sony, "On cross-slot scheduling for power saving", 3GPP TSG RAN WG1 #97, R1-1906857, Reno, USA, May 13-17, 2019, 7 pages.
Notice of Reasons for Refusal with English translation, issued in corresponding JP application No. 2021-573197, dated Jun. 25, 2024, 8 pages.

* cited by examiner

METHODS FOR CONTROLLING COMMUNICATION STATES, TERMINAL, AND NETWORK DEVICE

CROSS-REFERENCE TO RELATED APPLICATION(S)

This application is a continuation of International Application No. PCT/CN2020/090082, filed on May 13, 2020, which claims priority to International Application No. PCT/CN2019/091952, filed on Jun. 19, 2019, the entire disclosures of both of which are hereby incorporated by reference.

TECHNICAL FIELD

The present disclosure relates to the technical field of mobile communications, and in particular, to methods for controlling communication states, a terminal, and a network device

BACKGROUND

In the fifth generation (5G) mobile communications and long term evolution (LTE) evolution projects, an enhancement mechanism for discontinuous reception (DRX) is discussed. A new energy-saving mechanism is cross-slot scheduling. With introduction of the cross-slot scheduling, power consumption of terminals can be reduced. However, after the introduction of the cross-slot scheduling, if the terminal and a network have different understanding of the scheduling method, communication problems may occur.

SUMMARY

Implementations of the present disclosure provide methods for controlling communication states, a terminal, and a network device.

Implementations of the present disclosure provide a method for controlling communication states. The method includes the following. The terminal receives a physical downlink control channel (PDCCH) from a network device in a first time slot, where the PDCCH carries first indication information indicative of a first communication state. The terminal enters the first communication state in a second time slot according to the first indication information, where the second time slot is after the first time slot.

A method for controlling communication states provided in implementations of the present disclosure includes the following. A network device transmits a PDCCH to a terminal, where the PDCCH carries first indication information indicative of a first communication state, the first indication information is used for directing the terminal to enter the first communication state in a second time slot when the first indication information is received by the terminal in a first time slot, and the second time slot is after the first time slot.

A terminal provided in implementations of the present disclosure includes a transceiver, a processor, and a memory storing computer programs which, when executed by the processor, cause the transceiver to receive a PDCCH from a network device in a first time slot, where the PDCCH carries first indication information indicative of a first communication state. The computer programs, when executed by the processor, further cause the processor to enter the first communication state in a second time slot according to the first indication information, where the second time slot is after the first time slot.

A network device provided in implementations of the present disclosure includes a transceiver, a processor and a memory storing computer programs which, when executed by the processor, cause the transceiver to transmit a PDCCH to a terminal, where the PDCCH carries first indication information indicative of a first communication state, the first indication information is used for directing the terminal to enter the first communication state in a second time slot when the first indication information is received by the terminal in a first time slot, and the second time slot is after the first time slot.

BRIEF DESCRIPTION OF DRAWINGS

The accompanying drawings described herein are used to provide a further understanding of the present disclosure and constitute a part of the present disclosure. Exemplary implementations and description of the present disclosure are used to explain the present disclosure and do not constitute an improper limitation for the present disclosure. The accompanying drawings include the following.

DETAILED DESCRIPTION

The technical solutions in implementations of the present disclosure will be described in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

The technical solutions in the implementations of the present disclosure can be applied to various communication systems, such as a global system of mobile communication (GSM), a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a fifth generation (5G) system, or the like.

Figure 1:
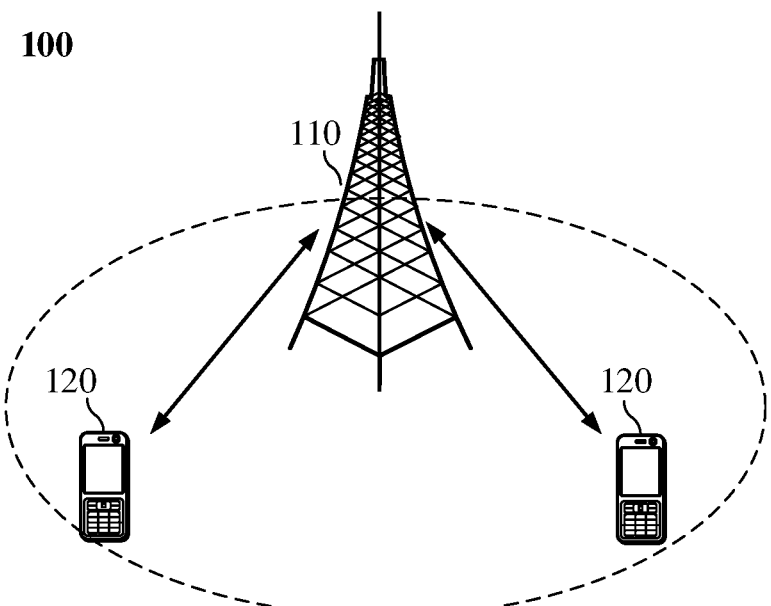
FIG. 1 is a schematic diagram illustrating a communication system architecture according to an implementation of the present disclosure.

For example, a communication system 100 in an implementation of the present disclosure is illustrated in FIG. 1. The communication system 100 may include a network device 110. The network device 110 can communicate with a terminal 120 (or called a communication terminal or a terminal). The network device 110 can provide communication coverage for a specific geographic area and communicate with terminals in the coverage area. In an implementation, the network device 110 may be a base station (base transceiver station, BTS) in the GSM or CDMA system, a base station (NodeB, NB) in the WCDMA system, an evolutional base station (evolutional node B, eNB or eNodeB) in the LTE system, or a wireless controller in a cloud radio access network (CRAN). In an implementation, the network device 110 may be a mobile switch center, a relay station, an access point, a vehicle-mounted device, a wearable device, a hub, a switch, a network bridge, a router, a network device in the 5G network, a network device in a future evolution public land mobile network (PLMN), or the like The communication system 100 further includes at least one terminal 120 in the coverage area of the network device 110. The "terminal" used herein may include but is not limited to a device coupled via a wired line, and/or other data connection/network, and/or a wireless interface, and/or a device communicating with another terminal to receive/transmit communication signals, and/or an Internet of Things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal configured to communicate via the wireless interface may be called a "wireless communication terminal", a "wireless terminal", or a "mobile terminal". Examples of a mobile terminal may include, but are not limited to, a satellite or cellular telephone, a personal communication system (PCS) terminal capable of combining cellular radio telephone and data processing, fax and data communication, a personal digital assistant (PDA) equipped with radio telephone, pager, Internet/Intranet access, web browsing, a notebook, a calendar, and/or a global positioning system (GPS) receiver, and a conventional laptop and/or a handheld receiver or other electronic devices equipped with a radio telephone transceiver. The terminal may refer to an access terminal, user equipment (UE), a user unit, a user station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with a wireless communication function, a computing device or other processing devices coupled with wireless modems, a vehicle-mounted device, a wearable device, a terminal in the 5G network or the future evolution PLMN, or the like.

In an implementation, the terminals 120 may communication with each other via device to device (D2D) communication.

In an implementation, the 5G system or 5G network may also be referred to as a new radio (NR) system or an NR network.

As an example, FIG. 1 illustrates a network device and two terminals. In an implementation, the communication system 100 may include multiple network devices, and in the coverage area of each network device, there may be one or more terminals, which is not limited in the implementation of the present disclosure.

In an implementation, the communication system 100 may further include a network controller, a mobility management entity (MME), or other network entities, which is not limited in the implementation of the present disclosure.

It is to be understood that in the implementation of the present disclosure, in a network/system, a device with a communication function can be called a communication device. The communication system 100 illustrated in FIG. 1 is taken as an example. The communication devices may include the network device 110 and the terminal 120 that have a communication function. The network device 110 and the terminal 120 may be the devices described above, which is not repeated herein. The communication devices may further include other devices in the communication system 100, such as the network controller, the MME, or other network entities, which is not limited in the implementation of the present disclosure.

It is to be understood that the terms "system" and "network" in the specification are often used interchangeably in the specification. The term "and/or" in the specification is only a description of an association relationship of associated objects, which means that there may be three relationships, for example, A and/or B, which may mean that: A exists alone, A and B both exist, and B exists alone. In addition, the character "/" in the specification generally means that an object before "/" and an object after "/" are in an "or" relationship.

In order to facilitate understanding of the technical solutions in the implementations of the present disclosure, the related technologies in the implementations of the present disclosure will be illustrated below.

DRX

Taking into account power saving of terminals, existing systems all support a DRX transmission mechanism. The main principle of the DRX is to realize discontinuous reception of signals in the time domain via a semi-static configuration. When no data transmission exists, power consumption can be reduced by stopping receiving a physical downlink control channel (PDCCH) (at this point, PDCCH blind detection is stopped), thereby prolonging battery lifespan.

Figure 2:
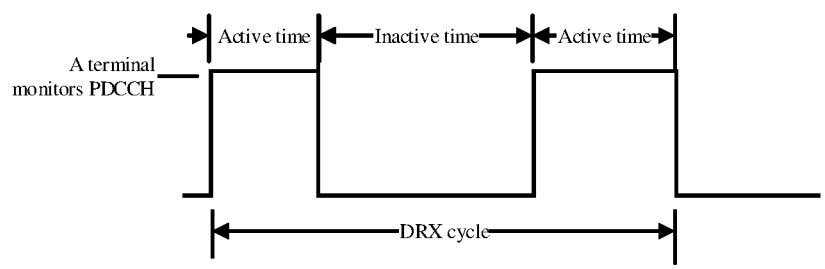
FIG. 2 is a schematic diagram illustrating a discontinuous reception (DRX) cycle according to an implementation of the present disclosure.

For example, in the LTE system, the method for configuring the DRX is to configure a DRX cycle for a terminal in a connected state. As illustrated in FIG. 2, the DRX cycle is composed of active time and inactive Time. During the active time, the terminal monitors and receives the PDCCH (active period). During the inactive time, the terminal does not receive the PDCCH to reduce power consumption (sleep period). In addition, transmission of a paging message belongs to a DRX mechanism in an idle state, and at this point, the DRX cycle is a cycle of the paging message.

The active time and the inactive time are formed in the following way: the time is divided into successive DRX cycles. At the beginning of each DRX cycle, enter a DRX ON state. When in the DRX ON state, the terminal detects the PDCCH according to a configured monitoring occasion (MO). When the terminal detects the PDCCH, an inactivity timer is started or refreshed. If the DRX ON state does not end or the inactivity timer does not stop, the terminal is in the active time. The terminal in the active time needs to detect the PDCCH.

The 5G NR also follows the energy-saving mechanism of the LTE, and a method for configuring DRX defined by the 5G NR inherits the DRX configuration defined by the LTE.

Energy Saving of Cross-Slot Scheduling

Figure 3:
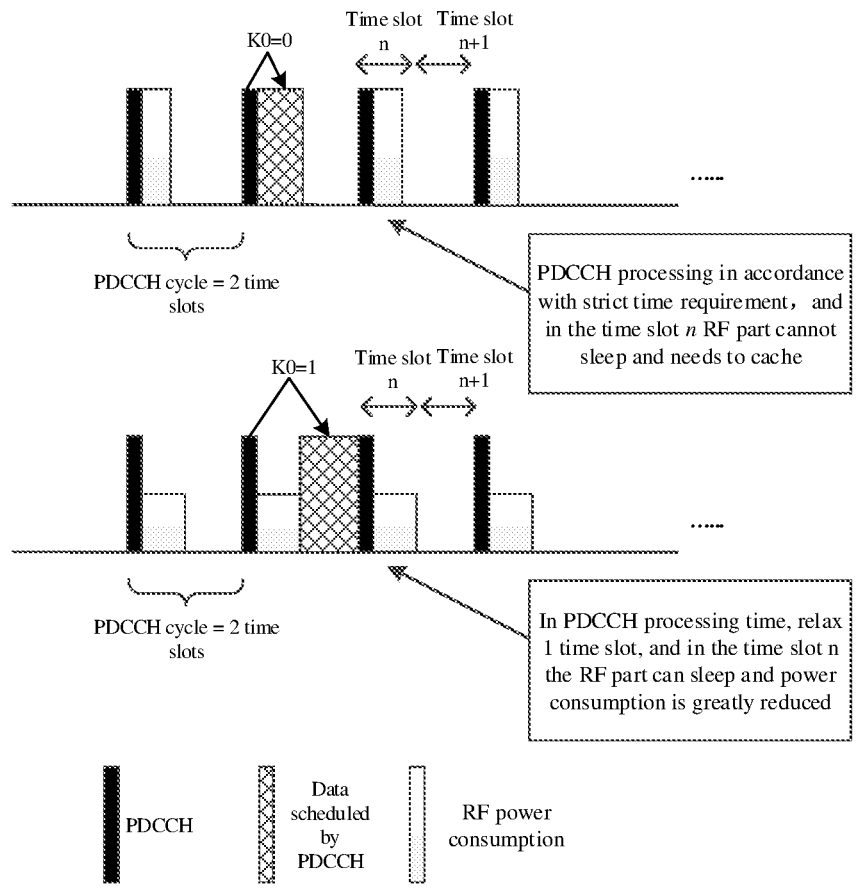
FIG. 3 is a schematic diagram illustrating a cross-slot scheduling according to an implementation of the present disclosure.

In 5G and LTE evolution projects, an enhancement mechanism for the DRX is discussed. A new energy-saving mechanism is cross-slot scheduling. The basic principle of the cross-slot scheduling is illustrated in FIG. 3. The PDCCH detection is configured as periodic detection (for example, in FIG. 3 one PDCCH detection cycle includes two time slots). However, a common situation is that in most PDCCH detection cycles no data scheduling is detected, but the terminal must perform data caching after the PDCCH detection. When the cross-slot scheduling is implemented, the terminal does not need to perform data caching after the PDCCH detection, and can turn off a radio frequency module immediately after the PDCCH detection. K0 in FIG. 3 represents an offset between a time slot where the PDCCH locates and a time slot where a scheduled physical downlink shared channel (PDSCH) locates.

The introduction of the cross-slot scheduling reduces the power consumption of the terminal, but it is necessary to introduce a mechanism that is used for the network to notify the terminal to enter a cross-slot scheduling state. It may be considered to directly inform, using the PDCCH, the terminal of the cross-slot scheduling state that the terminal needs to enter.

The configuration of the DRX mechanism is relatively complicated, and there is a certain configuration signaling cost. The DRX mechanism adopts the semi-static configuration, and thus there is a relatively great limitation in flexibility. The energy-saving method of using the PDCCH to directly instruct the terminal to enter the cross-slot scheduling state can better adapt to dynamic scheduling changes and is more flexible than the DRX configuration.

Regarding the mechanism of using the PDCCH to indicate the cross-slot scheduling state, following problems need to be considered.

1) By means of the PDCCH, there is a certain missed detection probability. Once the terminal loses the PDCCH that is sent by the network and indicative of the cross-slot scheduling state, the terminal and the network may have inconsistent understanding of the cross-slot scheduling state.
2) When the terminal receives an energy-saving indication signal (for example the PDCCH) indicative of the cross-slot scheduling state, the terminal needs to take a certain switch time to switch to the cross-slot scheduling state.
3) If the energy-saving indication signal indicative of the cross-slot scheduling state is used in combination with the DRX configuration, the energy-saving indication signal indicative of the cross-slot scheduling state can be sent before the DRX ON state via a dedicated control channel (i.e., a dedicated physical layer signal). In addition, when the energy-saving indication signal before the DRX ON state (such as the dedicated control channel) and the energy-saving indication signal in the DRX ON state (such as the PDCCH) both exist, a corresponding processing mechanism needs to be defined.

Based on the above, the following technical solutions of the implementations of the present disclosure are provided, which can realize the energy-saving function of the cross-slot scheduling. It is to be noted that the technical solutions of the implementations of the present disclosure can also be extended to the number (amount) of multiple input multiple output (MIMO) transmission layers used for limiting data reception of the terminal, thereby realizing the energy-saving function. The technical solutions of the implementations of the present disclosure will be described in detail below.

Figure 4:
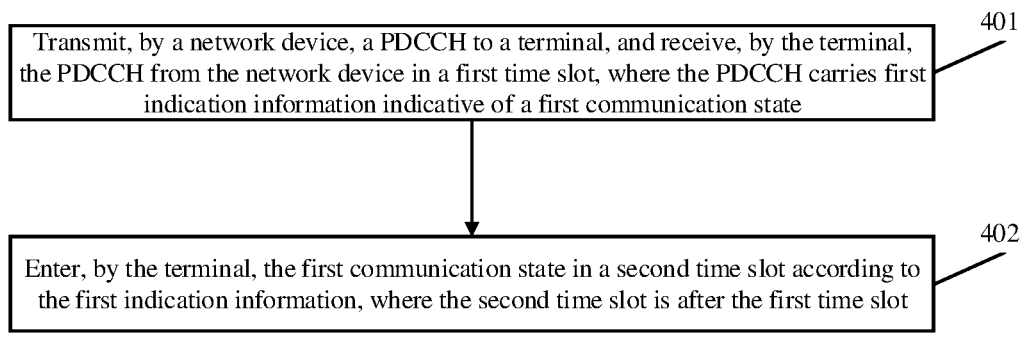
FIG. 4 is a schematic flow chart illustrating a method for controlling communication states according to an implementation of the present disclosure.

FIG. 4 is a schematic flow chart illustrating a method for controlling communication states according to an implementation of the present disclosure. As illustrated in FIG. 4, the method for controlling communication states includes the following.

At block 401, a network device transmits a PDCCH to a terminal, and the terminal receives the PDCCH from the network device in a first time slot, where the PDCCH carries first indication information indicative of a first communication state.

In an implementation of the present disclosure, the network device may be a base station, such as a generation NodeB (gNB), eNB, or the like.

In an implementation of the present disclosure, the PDCCH is also referred to as an energy-saving indication signal or an energy-saving scheduling signal. The PDCCH carries the first indication information indicative of the first communication state that the terminal needs to enter. The first communication state may be a first cross-slot scheduling state or a first MIMO transmission layer number state.

In an implementation of the present disclosure, by means of the following manner, the PDCCH is set to carry the first indication information. In the PDCCH, add bits corresponding to the first indication information, and the bits are indicative of the first communication state.

In an implementation of the present disclosure, the PDCCH further carries at least one of the following: frequency-domain scheduling information of a data channel, time-domain scheduling information of the data channel, modulation and coding scheme (MCS) indication information, power control information, channel state information (CSI) trigger information, and bandwidth part (BWP) switch indication information. The data channel includes at least one of the following: a PDSCH and a physical uplink shared channel (PUSCH).

At block 402, the terminal enters the first communication state in a second time slot according to the first indication information, where the second time slot is after the first time slot.

In an implementation of the present disclosure, since the terminal needs to take a certain switch time to switch to the first communication state indicated by the PDCCH when the terminal receives the PDCCH, the terminal enters the first communication state indicated by the PDCCH in the second time slot after the terminal receives the PDCCH in the first time slot. The following will illustrate the technical solutions in the implementation of the present disclosure in combination with different application scenarios.

A first scenario is as follows.

The first communication state is the first cross-slot scheduling state. The terminal compares the first cross-slot scheduling state with a second cross-slot scheduling state that the terminal is currently in. When the first cross-slot scheduling state is different from the second cross-slot scheduling state, the terminal enters the first cross-slot scheduling state in the second time slot.

For example, the UE receives the PDCCH from the network device in a time slot n. The first cross-slot scheduling state is indicated by N bits in the PDCCH. For example, 2 bits in the PDCCH are indicative of the first cross-slot scheduling state. The UE compares the first cross-slot scheduling state indicated by the PDCCH with the second cross-slot scheduling state that the UE is currently in. If the first cross-slot scheduling state is different from the second cross-slot scheduling state, the UE enters the first cross-slot scheduling state in a time slot n+x. Herein, the second cross-slot scheduling state that the UE is currently in refers to a cross-slot scheduling state of the UE in the time slot n.

In an implementation of the present disclosure, there is an offset of x time slots between the second time slot and the first time slot, and x is a positive integer. Further, x is the maximum between a and $S_c$, a is a constant, and $S_c$ is a slot offset corresponding to the second cross-slot scheduling state that the terminal is currently in.

For example, x=MAX (a, $S_c$), where $S_c$ is the slot offset corresponding to the second cross-slot scheduling state that the UE is currently in, and a is a constant (for example a=1). What needs to be illustrated is that the slot offset corresponding to the cross-slot scheduling state is K0 illustrated in FIG. 3, that is, an offset between a time slot where the data channel scheduled by the PDCCH locates and the time slot where the PDCCH locates.

In an implementation of the present disclosure, the first indication information includes N bits, where N is a positive integer. Different values of the first indication information are indicative of different first cross-slot scheduling states, and a correspondence between the first cross-slot scheduling states and the values of the N bits is configured by high-layer signaling. Herein, the high-layer signaling is radio resource control (RRC) signaling for example.

For example, N=2, that is, each first cross-slot scheduling state is indicated by 2 bits. "00" are indicative of a cross-slot scheduling state 1, and a slot offset corresponding to the cross-slot scheduling state 1 is 0, that is, scheduling is performed by crossing at least zero time slot, i.e., $S_c$=0 (in-slot scheduling is allowed). "01" are indicative of a cross-slot scheduling state 2, and a slot offset corresponding to the cross-slot scheduling state 2 is 1, that is, scheduling is performed by crossing at least one time slot, i.e., $S_c$=1. "10" are indicative of a cross-slot scheduling state 3, and a slot offset corresponding to the cross-slot scheduling state 3 is 2, that is, scheduling is performed by crossing at least two time slots, i.e., $S_c$=2. "11" are indicative of a cross-slot scheduling state 4, and a slot offset corresponding to the cross-slot scheduling state 4 is 3, that is, scheduling is performed by crossing at least three time slots, i.e., $S_c$=3. What needs to be illustrated is that the slot offset corresponding to the cross-slot scheduling state according to an implementation of the present disclosure refers to a minimum slot offset corresponding to the cross-slot scheduling state.

In an implementation of the present disclosure, the values of the N bits are determined by the number (amount) of cross-slot scheduling states of the PUSCH and the number (amount) of cross-slot scheduling states of the PDSCH that are configured by the high-layer signaling. In the implementation, if the high-layer signaling does not configure the number of the cross-slot scheduling states of the PUSCH and the number of the cross-slot scheduling states of the PDSCH, the values of the N bits are 0. If the high-layer signaling configures the number of the cross-slot scheduling states of the PUSCH and/or the number of the cross-slot scheduling states of the PDSCH, the values of the N bits are 1.

Herein, the high-layer signaling can configure both the number of the cross-slot scheduling states of the PUSCH and the number of the cross-slot scheduling states of the PDSCH. Alternatively, the high-layer signaling can configure only the number of the cross-slot scheduling states of the PUSCH or configure only the number of the cross-slot scheduling states of the PDSCH. Alternatively, the high-layer signaling does not configure both the number of the cross-slot scheduling states of the PUSCH and the number of the cross-slot scheduling states of the PDSCH.

What needs to be illustrated is that the number of the cross-slot scheduling states of the PDSCH is used for determining a first slot offset for the PDSCH, and the number of the cross-slot scheduling states of the PUSCH is used for determining a second slot offset for the PUSCH.

In an implementation of the present disclosure, there are two slot offsets corresponding to the first cross-slot scheduling state indicated by the first indication information, which are a slot offset for the PDSCH (called the first slot offset) and a slot offset for the PUSCH (called the second slot offset). The first slot offset for the PDSCH and the second slot offset for the PUSCH are different.

Furthermore, the first slot offset for the PDSCH and the second slot offset for the PUSCH can be configured by means of the following two manners.

1) Each first cross-slot scheduling state corresponds to a set of slot offsets, where the set of slot offsets include the first slot offset for the PDSCH and the second slot offset for the PUSCH. For example, the first cross-slot scheduling state is indicated by 2 bits. Any values of the 2 bits can correspond to a combination of the following two slot offsets: a slot offset for the PDSCH (scheduled by the PDCCH) relative to the PDCCH (i.e., the first slot offset) and a slot offset for the PUSCH (scheduled by the PDCCH) relative to the PDCCH (i.e., the second slot offset).

2) Each first cross-slot scheduling state corresponds to one slot offset, where the slot offset is the first slot offset for the PDSCH or the second slot offset for the PUSCH. For example, the first cross-slot scheduling is indicated by 2 bits. Any values of the 2 bits can correspond to one of the following slot offsets: the slot offset for the PDSCH (scheduled by the PDCCH) relative to the PDCCH (i.e., the first slot offset) and the slot offset for the PUSCH (scheduled by the PDCCH) relative to the PDCCH (i.e., the second slot offset). That is, the slot offset for the PDSCH and the slot offset for the PUSCH are independently configured.

In an implementation, if the high-layer signaling configures a value representing the first cross-slot scheduling state, the slot offset corresponding to the first cross-slot scheduling state is the value representing the first cross-slot scheduling state. If the high-layer signaling does not configure the value representing the first cross-slot scheduling state, the slot offset corresponding to the first cross-slot scheduling state is a constant for example 0, which indicates that the first cross-slot scheduling state is the in-slot scheduling.

For the PUSCH, the first slot offset for the PUSCH can be determined as follows. If the high-layer signaling configures the value representing the first cross-slot scheduling state, the first slot offset for the PUSCH is the value representing the first cross-slot scheduling state. If the high-layer signaling does not configure the value representing the first cross-slot scheduling state, the first slot offset for the PUSCH is a constant for example 0.

For the PDSCH, the first slot offset for the PDSCH can be determined as follows. If the high-layer signaling configures the value representing the first cross-slot scheduling state, the first slot offset for the PDSCH is the value representing the first cross-slot scheduling state. If the high-layer signaling does not configure the value representing the first cross-slot scheduling state, the first slot offset for the PDSCH is a constant for example 0.

In an implementation of the present disclosure, a fault-tolerant mechanism is further provided. The fault-tolerant mechanism includes the following.

1) When the terminal determines that time-domain scheduling information of a first PDSCH does not match the second cross-slot scheduling state that the terminal is currently in, the terminal transmits a negative feedback message to the network device, where the first PDSCH is a PDSCH scheduled by the PDCCH that is received by the terminal in the first time slot.

Herein, if a slot offset corresponding to the time-domain scheduling information of the PDSCH is smaller than a slot offset corresponding to the second cross-slot scheduling state that the terminal is currently in, the terminal determines that the time-domain scheduling information of the first PDSCH does not match the second cross-slot scheduling state that the terminal is currently in.

For example, under the condition that the UE receives the PDCCH in a time slot n, if the time-domain scheduling information of the PDSCH scheduled by the PDCCH does not match the second cross-slot scheduling state that the terminal is currently in, the UE feeds back negative acknowledgement (NACK) to the network device. When the slot offset corresponding to the time-domain scheduling information of the PDSCH scheduled by the PDCCH is smaller than $S_c$, it is determined that the time-domain scheduling information of the PDSCH scheduled by the PDCCH does not match the second cross-slot scheduling state that the terminal is currently in. What needs to be illustrated is that when the slot offset corresponding to the time-domain scheduling information of the PDSCH scheduled by the PDCCH is smaller than $S_c$, the UE cannot receive the PDSCH. The UE expects to receive the PDSCH the slot offset for which is larger than or equal to $S_c$, and thus the UE feeds back the NACK to the network device.

2) When the terminal determines that the time-domain scheduling information of a first PUSCH does not match the second cross-slot scheduling state that the terminal is currently in, the terminal does not transmit the first PUSCH to the network device, where the first PUSCH is a PUSCH scheduled by the PDCCH that is received by the terminal in the first time slot.

Herein, if a slot offset corresponding to the time-domain scheduling information of the first PUSCH is smaller than the slot offset corresponding to the second cross-slot scheduling state that the terminal is currently in, the terminal determines that the time-domain scheduling information of the first PUSCH does not match the second cross-slot scheduling state that the terminal is currently in.

For example, under the condition that the UE receives the PDCCH in the time slot n, if the time-domain scheduling information of the PUSCH scheduled by the PDCCH does not match the second cross-slot scheduling state that the terminal is currently in, the UE does not transmit the PUSCH scheduled by the PDCCH to the network device. When the slot offset of the time-domain scheduling information of the PUSCH scheduled by the PDCCH is smaller than $S_c$, the terminal determines that the time-domain scheduling information of the first PUSCH does not match the second cross-slot scheduling state that the terminal is currently in.

In an implementation of the present disclosure, when the time-domain scheduling information of the data channel (PUSCH or PDSCH) scheduled by the PDCCH does not match the second cross-slot scheduling state that the terminal is currently in, the terminal ignores the scheduling of the data channel, but other domains in the PDCCH such as the first indication information, power control information and so on are still valid.

In an implementation of the present disclosure, before the terminal receives the first indication information, the terminal is in a default cross-slot scheduling state, where a slot offset corresponding to the default cross-slot scheduling state is 0 or a positive integer.

For example, when the UE does not receive the first indication information indicative of the first cross-slot scheduling state, the UE sets the default cross-slot scheduling state. The slot offset corresponding to the default cross-slot scheduling is minimum for example 0.

In an implementation of the present disclosure, all PDCCH DCI formats monitored by the terminal can carry the first indication information.

In an implementation of the present disclosure, the above-mentioned solution of using the PDCCH to indicate the cross-slot scheduling state can coexist with the DRX mechanism. The terminal receives a dedicated control channel sent by the network device, and the dedicated control channel carries second indication information indicative of the default cross-slot scheduling state. According to the second indication information, the terminal enters the default cross-slot scheduling state at the beginning of the DRX ON state, and enter the default cross-slot scheduling state at the end of the DRX ON state. For example: 1) When the UE enters the DRX ON state, the UE performs communication according to the default cross-slot scheduling state indicated by the dedicated control channel before the DRX ON state. 2) When the DRX ON state ends, the UE returns to the default cross-slot scheduling state for communication.

Figure 5:
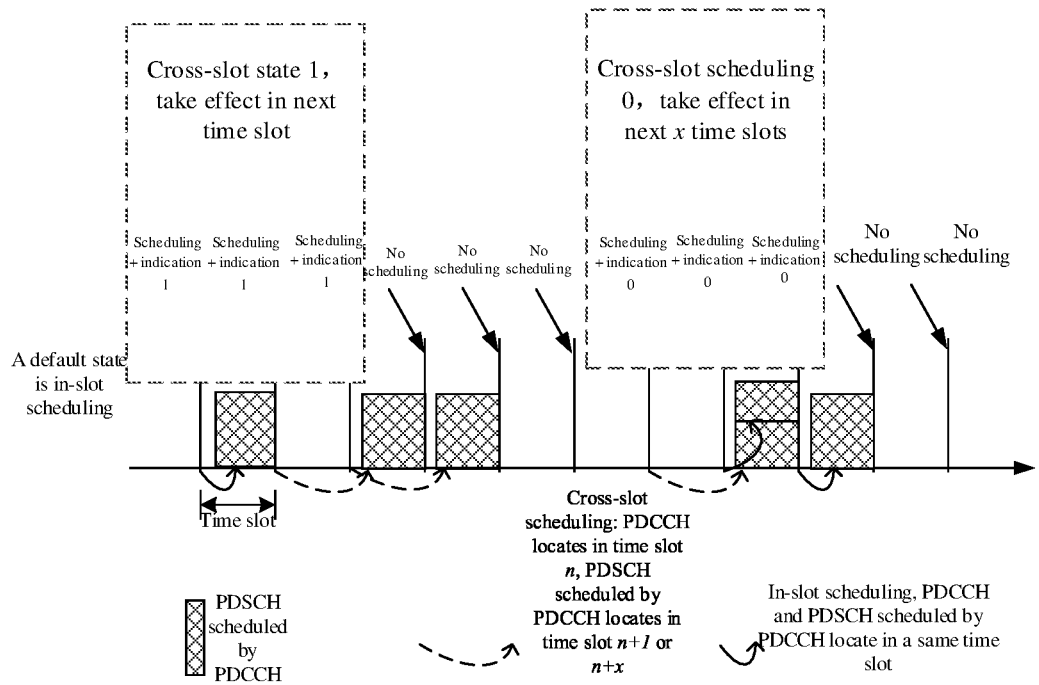
FIG. 5 is a schematic diagram illustrating a switch of cross-slot scheduling states according to an implementation of the present disclosure.

Referring to FIG. 5, a slot offset corresponding to the default cross-slot scheduling state is 0, that is, the in-slot scheduling is performed. The UE then receives the PDCCH. The PDCCH includes the scheduling information (time-domain scheduling information and frequency-domain scheduling information) of the data channel and the first indication information. In FIG. 5, this PDCCH is called scheduling plus indication 1 or scheduling plus indication 0 for short, where the scheduling refers to the scheduling information of the data channel, the indication 1 is indicative of the cross-slot scheduling state 1, and the indication 0 is indicative of the cross-slot scheduling state 0. In addition, the PDCCH may not contain scheduling information of any data channel and the first indication information, and in FIG. 5, this PDCCH is called no scheduling for short. As illustrated in FIG. 5, a PDCCH in a dashed frame on the left is used for directing the UE to enter the cross-slot scheduling state 1, and the UE will enter the cross-slot scheduling state 1 in the next time slot upon receiving the PDCCH. A PDCCH in a dashed frame on the right is used for directing the UE to enter the cross-slot scheduling state 0, and the UE will enter the cross-slot scheduling state 0 in the next x time slots upon receiving the PDCCH. In one example, x=MAX (a, $S_c$). In the example illustrated in FIG. 5, the slot offset corresponding to the cross-slot scheduling state 1 is 1, and the slot offset corresponding to the cross-slot scheduling state 0 is 0.

A second scenario is as follows.

The first communication state is the first MIMO transmission layer number state of the data channel. The terminal compares the first MIMO transmission layer number state with a second MIMO transmission layer number state that the terminal is currently in. If the first MIMO transmission layer number state is different from the second MIMO transmission layer number state, the terminal enters the first MIMO transmission layer number state in the second time slot.

For example, the UE receives the PDCCH from the network device in the time slot n. The N bits in the PDCCH are indicative of the first MIMO transmission layer number state of the data channel (PDSCH or PUSCH), for example, 2 bits in the PDCCH are indicative of the first MIMO transmission layer number state. The UE compares the first MIMO transmission layer number state indicated by the PDCCH with the second MIMO transmission layer number state that the UE is currently in. If the first MIMO transmission layer number state is different from the second MIMO transmission layer number state, the UE enters the first MIMO transmission layer number state indicated by the PDCCH in the time slot n+x. Herein, the second MIMO transmission layer number state that the UE is currently in refers to the MIMO transmission layer number state that the UE is in in the time slot n.

In an implementation of the present disclosure, there is an offset of x time slots between the second time slot and the first time slot, and x is a positive integer.

For example, x is a constant. For example x=1. Alternatively, x is calculated based on a sub-carrier width of the current PDCCH and other information.

In the implementation of the present disclosure, the first indication information includes the N bits, where N is a positive integer, and different values of the first indication information are indicative of different first MIMO transmission layer number states. A correspondence between the first MIMO transmission layer number states and the values of the N bits is configured by the high-layer signaling. Herein, the high-layer signaling is the RRC signaling for example.

In an implementation of the present disclosure, a fault-tolerant mechanism is provided according to the implementation of the present disclosure. The fault-tolerant mechanism is as follows. When the terminal determines that the number (amount) of MIMO transmission layers for first data is larger than the number (amount) of transmission layers limited by the second MIMO transmission layer number state that the terminal is currently in, the terminal transmits a negative feedback message to the network device, where the first data refers to data indicated by the PDCCH that is received by the terminal in the first time slot.

For example, when the number of the second MIMO transmission layers for the data indicated by the PDCCH that is received by the UE in the time slot n exceeds the maximum number of transmission layers limited by the current state of the UE, the UE feeds back NACK to the network device.

Herein, the number of transmission layers limited by the second MIMO transmission layer number state that the terminal is currently in is defined as follows. For the PDSCH, the number of transmission layers limited by the second MIMO transmission layer number state that the terminal is currently in is the maximum number of transmission layers for a PDSCH expected to be received by the terminal. For the PUSCH, the number of transmission layers limited by the second MIMO transmission layer number state that the terminal is currently in is the maximum number of transmission layers for the PUSCH able to be transmitted by the terminal.

In an implementation of the present disclosure, when the number of transmission layers for data scheduled by the PDCCH is not identical to the number of transmission layers limited by the second MIMO transmission layer number state that the terminal is currently in, other domains in the PDCCH for example the first indication information and the power control information are still valid.

According to the technical solution of the implementation of the present disclosure, the network can be allowed to reasonably trigger the energy-saving function of the terminal. In the technical solution of the implementation of the present disclosure, the existing PDCCH is extended. The extended PDCCH supports both the scheduling function of the data channel and the energy-saving indication function of the terminal, and no additional energy-saving physical layer signal is required. In the implementation of the present disclosure, dynamic signaling such as the PDCCH is adopted, and thus the terminal can enter the energy-saving state as soon as possible, and adaptive time of energy saving can be reduced from tens of microseconds to microsecond level. In addition, according to the technical solution of the implementations of the present disclosure, fault-tolerance processing in case of losing the PDCCH by the terminal is realized.

What needs to be noted is that the method adopted in the implementation of the present disclosure is based on the cross-slot scheduling state and the MIMO transmission layer number state. The important feature of the present disclosure is that the PDCCH is used to trigger switch between different communication states. The manner of switching the communication states can be extended to other signaling processes, and also can be extended to other energy-saving states of the terminal, such as a state of the maximum number of receiving antennas (i.e., maximum receiving antenna number state) of the terminal, a state of measurement periods (i.e., measure period state) of the terminal, etc.

Figure 6:
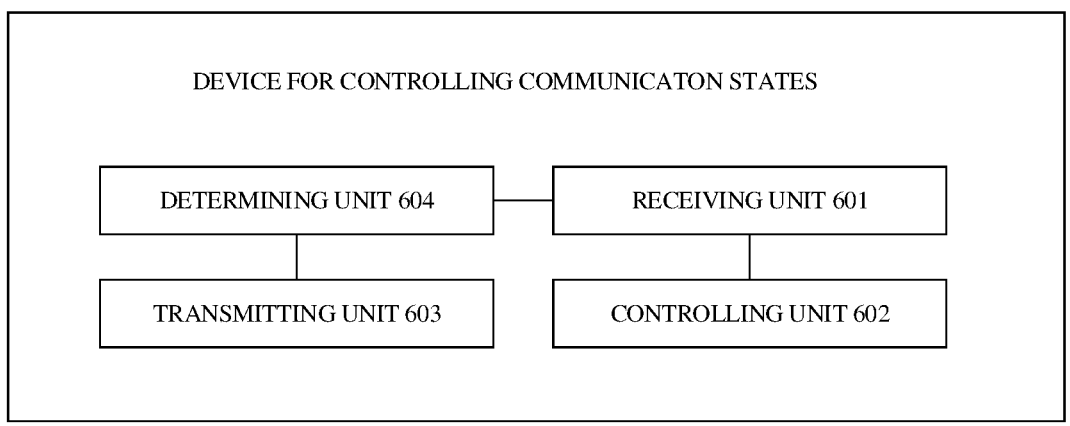
FIG. 6 is a first schematic structural diagram illustrating a device for controlling communication states according to an implementation of the present disclosure.

FIG. 6 is a first schematic structural diagram illustrating a device for controlling communication states according to an implementation of the present disclosure. The device for controlling communication states is applied to a terminal. As illustrated in FIG. 6, the device for controlling communication states includes a receiving unit 601 and a controlling unit 602.

The receiving unit 601 is configured to receive a PDCCH from a network device in a first time slot, where the PDCCH carries first indication information indicative of a first communication state.

The controlling unit 602 is configured to enter the first communication state in a second time slot according to the first indication information, where the second time slot is after the first time slot.

In an implementation, the first communication state is a first cross-slot scheduling state. The controlling unit 602 is configured to compare the first cross-slot scheduling state with a second cross-slot scheduling state that the terminal is currently in, and enter the first cross-slot scheduling state in the second time slot when the first cross-slot scheduling state is different from the second cross-slot scheduling state.

In an implementation, an offset of x time slots exists between the second time slot and the first time slot, where x is a positive integer.

In an implementation, x is the maximum between a and $S_c$, a is a constant, and $S_c$ is a slot offset corresponding to the second cross-slot scheduling state that the terminal is currently in.

In an implementation, the first indication information includes N bits, where N is a positive integer, different values of the first indication information are indicative of different first cross-slot scheduling states, and a correspondence between the first cross-slot scheduling states and the values of the N bits is configured by high-layer signaling.

In an implementation, the values of the N bits are determined by the number of cross-slot scheduling states of a PUSCH and the number of cross-slot scheduling states of a PDSCH that are configured by the high-layer signaling.

In an implementation, when the number of the cross-slot scheduling states of the PUSCH and the number of the cross-slot scheduling states of the PDSCH are not configured by the high-layer signaling, the values of the N bits are 0. When the number of the cross-slot scheduling states of the PUSCH and/or the number of the cross-slot scheduling states of the PDSCH are configured by the high-layer signaling, the values of the N bits are 1.

In an implementation, each of the first cross-slot scheduling states corresponds to a set of slot offsets, where the set of slot offsets include a first slot offset for the PDSCH and a second slot offset for the PUSCH.

In an implementation, each of the first cross-slot scheduling states corresponds to a slot offset, where the slot offset is a first slot offset for the PDSCH or a second slot offset for the PUSCH.

In an implementation, for each of the first cross-slot scheduling states, when a value representing the first cross-slot scheduling state is configured by the high-layer signaling, a slot offset corresponding to the first cross-slot scheduling state is the value representing the first cross-slot scheduling state, and when the value representing the first cross-slot scheduling state is not configured by the high-layer signaling, the slot offset corresponding to the first cross-slot scheduling state is a constant.

In an implementation, the first slot offset for the PDSCH is different from the second slot offset for the PUSCH.

In an implementation, the device further includes a transmitting unit 603 configured to transmit a negative feedback message to the network device, when the terminal determines that time-domain scheduling information of a first PDSCH does not match the second cross-slot scheduling state that the terminal is currently in, where the first PDSCH is a PDSCH scheduled by the PDCCH that is received by the terminal in the first time slot.

In an implementation, the device further includes a determining unit 604 configured to determine that the time-domain scheduling information of the first PDSCH does not match the second cross-slot scheduling state that the terminal is currently in, when a slot offset corresponding to the time-domain scheduling information of the first PDSCH is smaller than a slot offset corresponding to the second cross-slot scheduling state that the terminal is currently in.

In an implementation, the device further includes the transmitting unit 603 configured to transmit no first PUSCH to the network device, when the terminal determines that time-domain scheduling information of the first PUSCH does not match the second cross-slot scheduling state that the terminal is currently in, where the first PUSCH is a PUSCH scheduled by the PDCCH that is received by the terminal in the first time slot.

In an implementation, the device further includes the determining unit 604 configured to determine that the time-domain scheduling information of the first PUSCH does not match the second cross-slot scheduling state that the terminal is currently in, when a slot offset corresponding to the time-domain scheduling information of the first PUSCH is smaller than a slot offset corresponding to the second cross-slot scheduling state that the terminal is currently in.

In an implementation, the terminal stays in a default cross-slot scheduling state before receiving the first indication information, where a slot offset corresponding to the default cross-slot scheduling state is 0 or a positive integer.

In an implementation, the receiving unit 601 is configured to receive a dedicated control channel from the network device, where the DCCH carries second indication information indicative of the default cross-slot scheduling state. The controlling unit 602 is configured to enter the default cross-slot scheduling state at the beginning of a DRX ON state and enter the default cross-slot scheduling state at the end of the DRX ON state according to the second indication information.

In an implementation, the first communication state is a first MIMO transmission layer number state of a data channel. The controlling unit 602 is configured to compare the first MIMO transmission layer number state with a second MIMO transmission layer number state that the terminal is currently in, and enter the first MIMO transmission layer number state in the second time slot, when the first MIMO transmission layer number state is different from the second MIMO transmission layer number state.

In an implementation, an offset of x time slots exists between the second time slot and the first time slot, where x is a positive integer.

In an implementation, the first indication information includes the N bits, where N is a positive integer, different values of the first indication information are indicative of different first MIMO transmission layer number states, and a correspondence between the first MIMO transmission layer number states and the values of the N bits is configured by high-layer signaling.

In an implementation, the device further includes the transmitting unit 603 configured to transmit a negative feedback message to the network device, when the terminal determines that the number of MIMO transmission layers for first data is larger than the number of transmission layers limited by the second MIMO transmission layer number state that the terminal is currently in, where the first data is data indicated by the PDCCH that is received by the terminal in the first time slot.

In an implementation, the number of transmission layers limited by the second MIMO transmission layer number state that the terminal is currently in is the maximum number of transmission layers for a PDSCH expected to be received by the terminal. Alternatively, the number of transmission layers limited by the second MIMO transmission layer number state that the terminal is currently in is the maximum number of transmission layers for the PUSCH able to be transmitted by the terminal.

A person of ordinary skill in the art shall understand that in the implementations of the present disclosure, for related description of the above device for controlling communication states, reference can be made to the related description of the method for controlling communication states according to the implementation of the implementation of the present disclosure.

Figure 7:
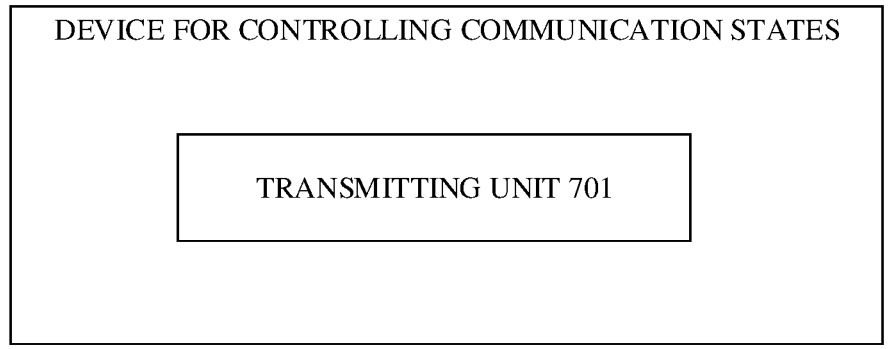
FIG. 7 is a second schematic structural diagram illustrating a device for controlling communication states according to an implementation of the present disclosure.

FIG. 7 is a second schematic structural diagram illustrating a device for controlling communication states according to an implementation of the present disclosure. The device for controlling communication states is applied to a network device. As illustrated in FIG. 7, the device for controlling communication states includes a transmitting unit 701.

The transmitting unit 701 is configured to transmit a PDCCH to a terminal, where the PDCCH carries first indication information indicative of a first communication state. The first indication information is used for directing the terminal to enter the first communication state in a second time slot when the first indication information is received by the terminal in a first time slot, and the second time slot is after the first time slot.

In an implementation, the first communication state is a first cross-slot scheduling state.

In an implementation, an offset of x time slots exists between the second time slot and the first time slot, where x is a positive integer.

In an implementation, x is the maximum between a and $S_c$, a is a constant, and $S_c$ is a slot offset corresponding to a second cross-slot scheduling state that the terminal is currently in.

In an implementation, the first indication information includes N bits, where N is a positive integer, different values of the first indication information are indicative of different first cross-slot scheduling states, and a correspondence between the first cross-slot scheduling states and the values of the N bits is configured by high-layer signaling.

In an implementation, each of the first cross-slot scheduling states corresponds to a set of slot offsets, where the set of slot offsets include a first slot offset for a PDSCH and a second slot offset for a PUSCH.

In an implementation, each of the first cross-slot scheduling states corresponds to a slot offset, where the slot offset is the first slot offset for the PDSCH or the second slot offset for the PUSCH.

In an implementation, the first slot offset for the PDSCH is different from the second slot offset for the PUSCH.

In an implementation, the first communication state is a first MIMO transmission layer number state of a data channel.

In an implementation, the offset of x time slots exists between the second time slot and the first time slot, where x is a positive integer.

In an implementation, the first indication information includes the N bits, where N is a positive integer, different values of the first indication information are indicative of different first MIMO transmission layer number states, and a correspondence between the first MIMO transmission layer number states and the values of the N bits is configured by the high-layer signaling.

In an implementation, the PDCCH further carries at least one of: frequency-domain scheduling information of the data channel, time-domain scheduling information of the data channel, MCS indication information, power control information, CSI trigger information, and BWP switch indication information.

A person of ordinary skill in the art shall understand that in an implementation of the present disclosure, for related description of the above device for controlling communication states, reference can be made to the related description of the method for controlling communication states according to the implementation of the present disclosure.

Figure 8:
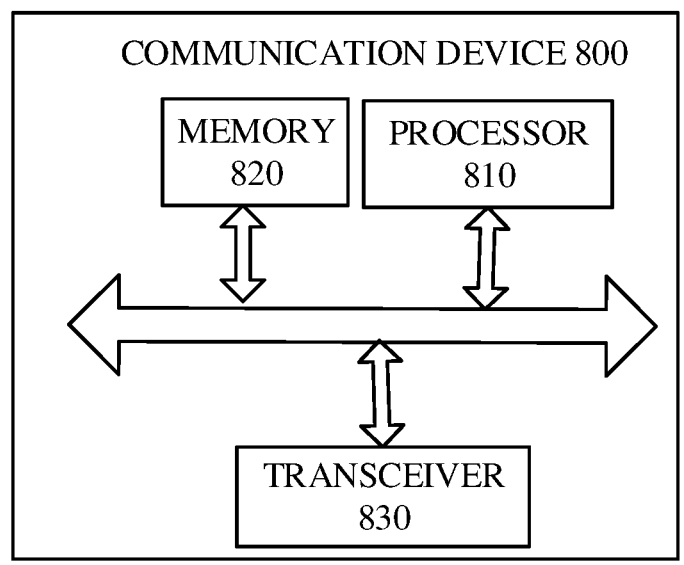
FIG. 8 is a schematic structural diagram illustrating a communication device according to an implementation of the present disclosure.

FIG. 8 is a schematic structural view illustrating a communication device 800 according to an implementation of the present disclosure. The communication device 800 may be a terminal or a network device. The communication device 800 illustrated in FIG. 8 includes a processor 810. The processor 810 can invoke and run at least one computer program in a memory to implement the method in the implementation of the present disclosure.

In an implementation, as illustrated in FIG. 8, the communication device 800 further includes a memory 820. The processor 810 can invoke and run the computer program in the memory 820 to implement the method in the implementation of the present disclosure.

The memory 820 may be a single device independent of the processor 810, and may also be integrated in the processor 810.

In an implementation, as illustrated in FIG. 8, the communication device 800 may further include a transceiver 830. The processor 810 can control the transceiver 830 to communication with other devices, for example, to transmit information or data to the other devices or receive information or data from the other devices.

In an implementation, the transceiver 830 may include a transmitter and a receiver. The transceiver 830 may further include one or more antennas.

The communication device 800 may be the network device in the implementations of the present disclosure, and the communication device 800 can implement corresponding procedures realized by the network device in the methods in the implementations of the present disclosure, which will not be repeated herein for simplicity.

The communication device 800 may be the mobile terminal/terminal in the implementations of the present disclosure, and the communication device 800 can implement corresponding procedures realized by the mobile terminal/terminal in the implementations of the present disclosure, which will not be repeated herein for simplicity.

Figure 9:
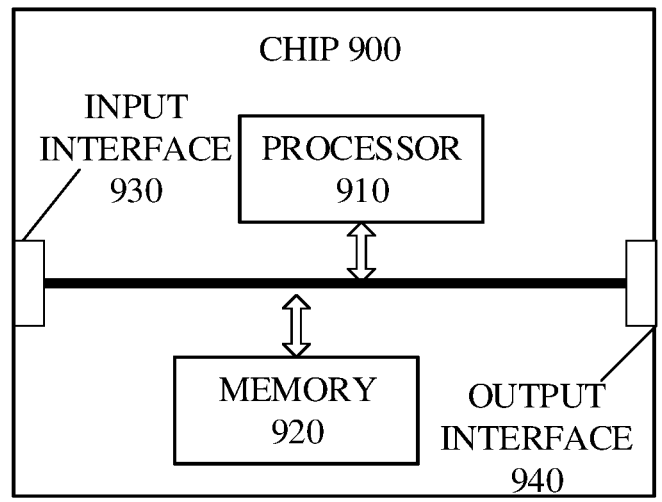
FIG. 9 is a schematic structural diagram illustrating a chip according to an implementation of the present disclosure.

FIG. 9 is a schematic structural diagram illustrating a chip according to an implementation of the present disclosure. The chip 900 illustrated in FIG. 9 includes a processor 910. The processor 910 can invoke and run at least one computer program stored in a memory to implement the methods in the implementation of the present disclosure.

In an implementation, as illustrated in FIG. 9, the chip 900 further includes a memory 920. The processor 910 can invoke and run at least one computer program stored in the memory 920 to implement the methods in the implementations of the present disclosure.

The memory 920 may be a single device independent of the processor 910, and may also be integrated in the processor 910.

In an implementation, the chip 900 may further include an input interface 930. The processor 910 can control the input interface 930 to communication with other devices or chips, for example, to receive information or data from the other devices or chips.

In an implementation, the chip 900 may further include an output interface 940. The processor 910 can control the output interface 940 to communication with other devices or chips, for example, to output information or data to the other devices or chips.

The chip can be applied to the network device in the implementations of the present disclosure, and the chip can implement corresponding procedures realized by the network device in the methods in the implementations of the present disclosure, which will not be repeated herein for simplicity.

The chip can be applied to the mobile terminal/terminal in the implementations of the present disclosure, and the chip can implement corresponding procedures realized by the mobile terminal/terminal in the methods in the implementations of the present disclosure, which will not be repeated herein for simplicity.

It is to be understood that the chip referred in the implementation of the present disclosure may also be referred to as a system-level chip, a system chip, a chip system, a system-on chip, or the like.

Figure 10:
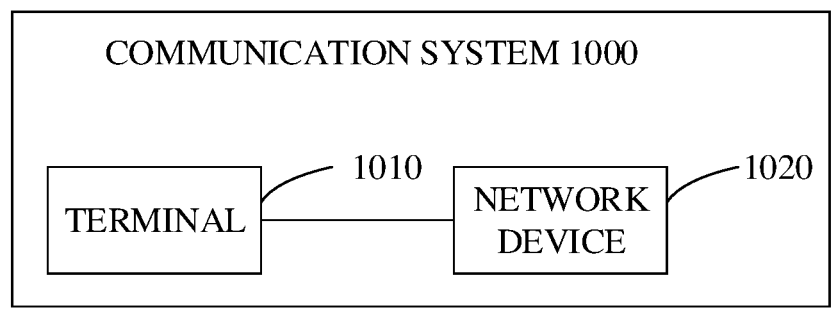
FIG. 10 is a schematic block diagram illustrating a communication system according to an implementation of the present disclosure.

FIG. 10 is a schematic block diagram illustrating a communication system 1000 according to an implementation of the present disclosure. As illustrated in FIG. 10, the communication system 1000 includes a terminal 1010 and a network device 1020.

The terminal 1010 can be used to implement corresponding functions realized by the terminal in the above method, and corresponding functions realized by the network device in the above method, which will not be repeated herein for simplicity.

It is to be understood that the processor in the implementation of the present disclosure may be an integrated circuit chip with signal processing capability. In the implementation process, the steps of the foregoing method implementations can be completed by hardware integrated logic circuits in the processor or instructions in the form of software. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, steps, and logical block diagrams disclosed in the implementations of the present disclosure can be implemented or executed. The general-purpose processor may be a microprocessor or the processor may also be any conventional processor or the like. The steps of the methods disclosed in the implementations of the present disclosure can be directly executed and completed by a hardware decoding processor, or executed and completed by a combination of hardware and software modules in the decoding processor. The software modules can be located in a mature storage medium in the field such as a random access memory, a flash memory, a read-only memory, a programmable read-only memory, an electrically erasable programmable memory, or a register. The storage medium is located in the memory, and the processor reads information in the memory and completes the steps of the above methods in combination with its hardware.

It can be understood that the memory may be a volatile memory or a non-volatile memory, and may also include both the volatile memory and non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and used for external high-speed cache. By way of examples rather than limitation, various random access memories can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It is to be noted that the memory described in this specification is intended to include but is not limited to these and any other suitable types of memories.

It is to be noted that the above memories are exemplary but not used for limitation. For example, the memory in the implementation of the present disclosure may also be a SRAM, a DRAM, an SDRAM, a DDR SDRAM, an ESDRAM, a SLDRAM, and a DR RAM. That is, the memory described in the implementation of the present disclosure is intended to include but is not limited to these and any other suitable types of memories.

Implementations of the present disclosure further provide a computer-readable storage medium configured to store at least one computer program.

In an implementation, the computer-readable storage medium can be applied to the network device in the implementations of the present disclosure, and the computer program enables a computer to execute corresponding procedures realized by the network device in the above methods in the implementations of the present disclosure, which will not be repeated herein for simplicity.

In an implementation, the computer-readable storage medium can be applied to the mobile terminal/terminal in the implementations of the present disclosure, and the computer program enables the computer to execute corresponding procedures realized by the mobile terminal/terminal in the above methods in the implementations of the present disclosure, which will not be repeated herein for simplicity.

Implementations of the present disclosure further provide a computer program product which includes at least one computer program instruction.

In an implementation, the computer program product can be applied to the network device in the implementations of the present disclosure, and the computer program instruction enables the computer to execute corresponding procedures realized by the network device in the above methods in the implementations of the present disclosure, which will not be repeated herein for simplicity.

In an implementation, the computer program product can be applied to the mobile terminal/terminal in the implementations of the present disclosure, and the computer program instruction enables the computer to execute corresponding procedures realized by the mobile terminal/terminal in the above methods in the implementations of the present disclosure, which will not be repeated herein for simplicity.

Implementations of the present disclosure further provide a computer program.

In an implementation, the computer program can be applied to the network device in the implementations of the present disclosure, and the computer program, when run in the computer, enables the computer to execute corresponding procedures realized by the network device in the above methods in the implementations of the present disclosure, which will not be repeated herein for simplicity.

In an implementation, the computer program can be applied to the mobile terminal/terminal in the implementations of the present disclosure, and the computer program, when run in the computer, enables the computer to execute corresponding procedures realized by the mobile terminal/terminal in the above methods in the implementations of the present disclosure, which will not be repeated herein for simplicity.

Those of ordinary skill in the art will appreciate that units and algorithmic operations of various examples described in connection with the implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

According to the several implementations provided in the present disclosure, it will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical coupling, mechanical coupling, or the like.

Separated units as illustrated may or may not be physically separated. Components or parts displayed as units may or may not be physical units, and may reside at one location or may be distributed to multiple networked units. Some of or all the units may be selectively adopted according to practical needs to achieve objectives of the solutions of the present disclosure.

In addition, the functional units in the various implementations of the present disclosure may be integrated into one processing unit, or each unit may exist alone physically, or two or more units may be integrated into one unit.

If the integrated units are implemented as software functional units and sold or used as standalone products, they may be stored in a computer readable storage medium. Based on such an understanding, the essential technical solution, or the portion that contributes to the relate art, or part of the technical solution of the present disclosure may be embodied as software products. The computer software products can be stored in a storage medium and may include multiple instructions that, when executed, can cause a computing device, e.g., a personal computer, a server, a network device, etc., to execute some of or all operations of the methods described in various implementations of the present disclosure. The above storage medium may include various kinds of media that can store program codes, such as a universal serial bus (USB) flash disk, a mobile hard drive, a ROM, a RAM, a RAM, a magnetic disk, or an optical disk.

The above are only specific implementations of the present disclosure, and the protection scope of the present disclosure is not limited to this. Any person skilled in the art can easily think of changes or substitutions within the technical scope disclosed in the present disclosure, and these changes or substitutions shall fall within the protection scope of the present disclosure. Therefore, the protection scope of the present disclosure shall be subject to the protection scope of the claims.

What is claimed is:

1. A method for controlling communication states, comprising:
   receiving, by a terminal, a physical downlink control channel (PDCCH) from a network device in a first time slot, wherein the PDCCH carries first indication information indicative of a first communication state; and
   entering, by the terminal, the first communication state in a second time slot according to the first indication information, wherein the second time slot is after the first time slot;
   wherein the first communication state is a first cross-slot scheduling state, and entering, by the terminal, the first communication state in the second time slot according to the first indication information comprises:
      entering, by the terminal, the first cross-slot scheduling state in the second time slot according to the first indication information;
   wherein entering, by the terminal, the first cross-slot scheduling state in the second time slot according to the first indication information comprises:
      entering, by the terminal, the first cross-slot scheduling state in the second time slot, when the first cross-slot scheduling state is different from a second cross-slot scheduling state that the terminal is currently in.

2. The method of claim 1, further comprising:
   prior to entering, by the terminal, the first cross-slot scheduling state in the second time slot according to the first indication information:
      comparing, by the terminal, the first cross-slot scheduling state with the second cross-slot scheduling state.

3. The method of claim 1, wherein an offset of x time slots exists between the second time slot and the first time slot, wherein x is a positive integer.

4. The method of claim 3, wherein x is the maximum between a and Sc, a is a constant, and Sc is a slot offset corresponding to the second cross-slot scheduling state that the terminal is currently in.

5. The method of claim 1, wherein the first indication information comprises N bits, wherein N is a positive integer, different values of the first indication information are indicative of different first cross-slot scheduling states, and a correspondence between the first cross-slot scheduling states and values of the N bits is configured by high-layer signaling.

6. The method of claim 5, wherein each first cross-slot scheduling state corresponds to a set of slot offsets, wherein the set of slot offsets comprise a first slot offset for the PDSCH and a second slot offset for a physical uplink shared channel (PUSCH).

7. The method of claim 6, wherein each first cross-slot scheduling state corresponding to a set of slot offsets comprises the following:
   the first cross-slot scheduling state is indicated by N bits, and any values of the N bits indicative of the first cross-slot scheduling state correspond to a combination of the first slot offset and the second slot offset.

8. The method of claim 1, further comprising:
   transmitting, by the terminal, no first PUSCH to the network device, when the terminal determines that time-domain scheduling information of the first PUSCH does not match the second cross-slot scheduling state that the terminal is currently in, wherein the first PUSCH is a PUSCH scheduled by the PDCCH that is received by the terminal in the first time slot.

9. The method of claim 8, further comprising:
   determining, by the terminal, that the time-domain scheduling information of the first PUSCH does not match the second cross-slot scheduling state, when a slot offset corresponding to the time-domain scheduling information of the first PUSCH is smaller than a slot offset corresponding to the second cross-slot scheduling state.

10. The method of claim 1, further comprising:
receiving, by the terminal, a dedicated control channel (DCCH) from the network device, wherein the DCCH carries second indication information indicative of a default cross-slot scheduling state; and
according to the second indication information, entering, by the terminal, the default cross-slot scheduling state at the beginning of a discontinuous reception (DRX) ON state, and entering, by the terminal, the default cross-slot scheduling state at the end of the DRX ON state.

11. A method for controlling communication states, comprising:
transmitting, by a network device, a physical downlink control channel (PDCCH) to a terminal, wherein the PDCCH carries first indication information indicative of a first communication state, wherein the first communication state is a first cross-slot scheduling state, and wherein the first indication information is used for directing the terminal to enter the first cross-slot scheduling state in a second time slot when the first indication information is received by the terminal in a first time slot and the first cross-slot scheduling state is different from a second cross-slot scheduling state that the terminal is currently in, wherein the second time slot is after the first time slot.

12. The method of claim 11, wherein an offset of x time slots exists between the second time slot and the first time slot, wherein x is a positive integer.

13. The method of claim 12, wherein x is the maximum between a and Sc, a is a constant, and Sc is a slot offset corresponding to the second cross-slot scheduling state that the terminal is currently in.

14. The method of claim 11, wherein the first indication information comprises N bits, wherein N is a positive integer, different values of the first indication information are indicative of different first cross-slot scheduling states, and a correspondence between the first cross-slot scheduling states and the values of the N bits is configured by high-layer signaling.

15. The method of claim 14, wherein each first cross-slot scheduling state corresponds to a set of slot offsets, wherein the set of slot offsets comprises a first slot offset for the PDSCH and a second slot offset for a physical uplink shared channel (PUSCH).

16. The method of claim 15, wherein each first cross-slot scheduling state corresponding to a set of slot offsets comprises the following:
the first cross-slot scheduling state is indicated by N bits, and any values of the N bits indicative of the first cross-slot scheduling state corresponds to a combination of the first slot offset and the second slot offset.

17. A terminal, comprising:
a transceiver;
a processor; and
a memory storing computer programs which, when executed by the processor, cause the transceiver to:
receive a physical downlink control channel (PDCCH) from a network device in a first time slot, wherein the PDCCH carries first indication information indicative of a first communication state;
the computer programs, when executed by the processor, causing the processor to:
enter the first communication state in a second time slot according to the first indication information, wherein the second time slot is after the first time slot;
wherein the first communication state is a first cross-slot scheduling state;
the computer programs causing the processor to enter the first communication state in the second time slot according to the first indication information causes the processor to:
enter the first cross-slot scheduling state in the second time slot according to the first indication information;
wherein the computer programs causing the processor to enter the first cross-slot scheduling state in the second time slot according to the first indication information causes the processor to:
enter the first cross-slot scheduling state in the second time slot, when the first cross-slot scheduling state is different from a second cross-slot scheduling state that the terminal is currently in.

18. The terminal of claim 17, wherein the first indication information comprises N bits, wherein N is a positive integer, different values of the first indication information are indicative of different first cross-slot scheduling states, and a correspondence between the first cross-slot scheduling states and values of the N bits is configured by high-layer signaling.

19. The terminal of claim 18, wherein each first cross-slot scheduling state corresponds to a set of slot offsets, wherein the set of slot offsets comprises a first slot offset for the PDSCH and a second slot offset for a physical uplink shared channel (PUSCH).

20. The terminal of claim 19, wherein each first cross-slot scheduling state corresponding to a set of slot offsets comprises the following:
the first cross-slot scheduling state is indicated by N bits, and any values of the N bits indicative of the first cross-slot scheduling state correspond to a combination of the first slot offset and the second slot offset.

21. A network device, comprising:
a transceiver;
a processor; and
a memory storing computer programs which, when executed by the processor, cause the transceiver to:
transmit a physical downlink control channel (PDCCH) to a terminal, wherein the PDCCH carries first indication information indicative of a first communication state, wherein the first communication state is a first cross-slot scheduling state, and the first indication information is used for directing the terminal to enter the first cross-slot scheduling state in a second time slot when the first indication information is received by the terminal in a first time slot and the first cross-slot scheduling state is different from a second cross-slot scheduling state that the terminal is currently in, wherein the second time slot is after the first time slot.

22. The network device of claim 21, wherein the first indication information comprises N bits, wherein N is a positive integer, different values of the first indication information are indicative of different first cross-slot scheduling states, and a correspondence between the first cross-slot scheduling states and the values of the N bits is configured by high-layer signaling.

23. The network device of claim 22, wherein each first cross-slot scheduling state corresponds to a set of slot offsets, wherein the set of slot offsets comprise a first slot offset for the PDSCH and a second slot offset for a physical uplink shared channel (PUSCH).

24. The network device of claim 23, wherein each first cross-slot scheduling state corresponding to a set of slot offsets comprises the following:

the first cross-slot scheduling state is indicated by N bits, and any values of the N bits indicative of the first cross-slot scheduling state corresponds to a combination of the first slot offset and the second slot offset.

* * * * *